United States Patent Office 3,116,940
Patented Jan. 7, 1964

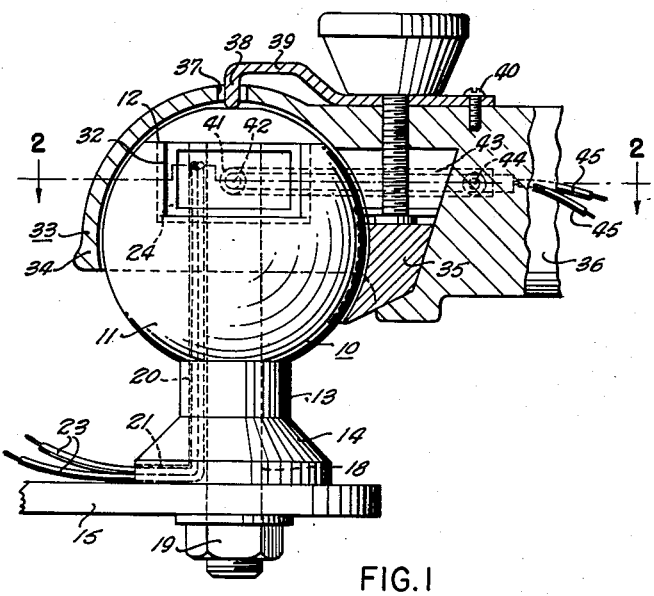
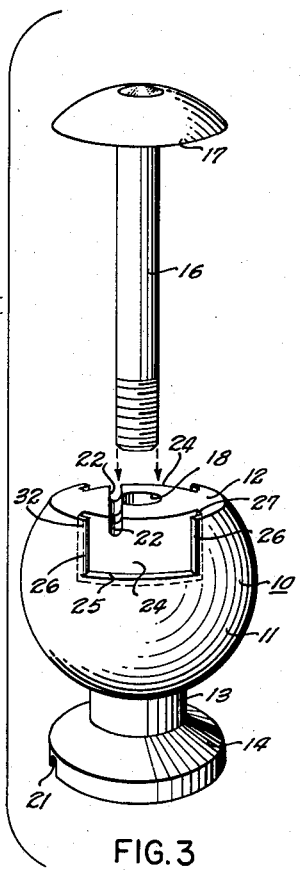
FIG.1
FIG.3
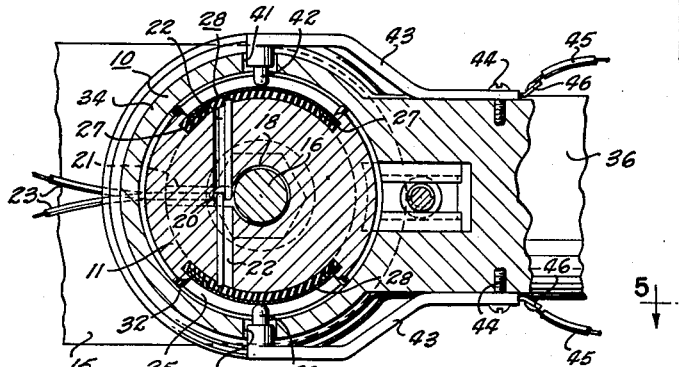
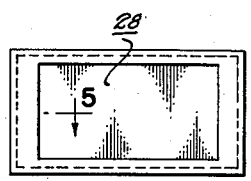
FIG.2
FIG.4
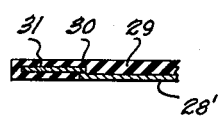
FIG.5
INVENTOR.
James E. Jines
BY
ATTORNEYS

3,116,940
ELECTRICAL CONNECTORS FOR TRAILER
HITCHES
James E. Jines, 113 S. Main, Perryton, Tex.
Filed June 21, 1962, Ser. No. 204,255
4 Claims. (Cl. 280—422)

This invention relates to new and useful improvements in electrical connectors for trailer hitches.

A principal object of the invention is to provide an improved trailer hitch having means for establishing between two vehicles connected by the hitch, a negative electrical lead and two positive electrical leads which are automatically established and energized when the hitch is in an assembled or connected condition.

A further object of the invention is to provide improved electrical connection means for trailer hitches having electrical contact plates which are uniquely mounted and held in position so as to furnish a strong and durable structure not subject to malfunctioning or the occurrence of electrical shorts.

Another object of the invention is to provide improved electrical connection means for trailer hitches well adapted for use by relatively minor modification of standard trailer hitches and therefore relatively inexpensive in cost.

An additional object of the invention is to provide an improved trailer hitch having incorporated therein electrical connection means, said hitch being quickly and easily assembled and free of complex parts tedious and expensive to incorporate into the finished structure.

Other and more particular objects will be apparent from a reading of the following description.

A construction designed to carry out the invention will be hereinafter described, together with other features of the invention.

The invention will be more readily understood from a reading of the following specification and by reference to the accompanying drawing, wherein an example of the invention is shown, and wherein:

FIG. 1 is a side elevational view, partly broken away, illustrating a trailer hitch having electrical connection means and constructed in accordance with this invention, FIG. 2 is a horizontal, cross-sectional view taken upon the line 2—2 of FIG. 1, FIG. 3 is an exploded view in perspective of the ball member, FIG. 4 is a view in elevation of one of the electrical contact assemblies, and FIG. 5 is an enlarged, horizontal, cross-sectional view taken upon the line 5—5 of FIG. 4.

In the drawings, the numeral 10 designates the ball member of a trailer hitch assembly, the ball member including an upper substantially spherical ball 11 having a flat upper end 12 and a depending post 13 joined by a base member 14 engaging the usual draw bar 15. A securing bolt having a shank 16 and an upwardly convex head 17 is positioned with the flat underside of the head 17 abutting the flat upper end 12 of the ball member, the shank 16 extending downwardly through a vertical axial bore 18 in the ball member 10 and through the draw bar 15 for reception on its lower end of a fastening nut 19. The bore 18 carries in one wall an elongate groove 20 which joins at its lower end a radial groove 21 cut in the underside of the base 14, and at its upper end with a pair of grooves 22 formed in the flat upper end 12 and extending laterally from the upper end of the groove 20. As indicated in FIGS. 1 and 2, electrical conductors 23 are received and carried in the several grooves.

The spherical or ball portion 11 of the ball member is formed in its upper portion in communication with the grooves 22 with a pair of diametrically-opposed recesses 24 which are relatively wide and shallow and which extend downwardly from the flat upper end 12 to a point spaced slightly above the center portion of the ball 11. Viewed in side elevation, the recesses 24 are in the shape of rectangles with the lower margin 25 thereof equal in length to the upper margin thereof, and the lateral margins 26 of the recesses also being equal in length. The marginal portions of the recesses adjacent the lateral edges 26 and the lower edge 25 thereof are undercut to form a peripheral groove 27 for reception of contact plate assemblies 28. Each of the contact assemblies 28 is formed of a sheet 29 of dielectric material such as a synthetic resin or the like contoured to fit within the recesses 24 with its side and bottom edges engaged within the groove 27 and its upper edge lying flush with the flat upper end 12 of the ball 11. The contact assemblies also include contact plates 28' having their surfaces exposed on the outer surfaces of the assemblies outwardly of the dielectric sheets 29, but, as shown in FIG. 2, spaced inwardly from the spherical surface defined by the outer surface of ball 11. All four margins of the contact plates 28' are offset toward the bottoms of the recesses as indicated at 30 and all four peripheral edges 31 of the contact plates are thus embedded within the marginal portions of the dielectric sheets 29 so as to be insulated electrically from the walls of the groove 27. As will appear more fully hereinafter, the point of offsetting at 30 is so positioned that no shorting can occur between the body of the ball 11 and the lateral edges of the contact plates 28' as contacts, to be described hereinafter, move thereacross. The electrical conductors 23, of course, extend through the grooves 22 and the dielectric sheets 29 for electrical connection to the pair of contact plates 28'. It is also to be noted that the lateral walls 26 of the recesses 24 have their outer corners rounded as shown at 32 so that the contacts may readily pass thereover without tending to catch or hang.

The trailer hitch also includes a ball socket member 33 arranged to engage the ball member and be locked thereto in pivotal relationship when the trailer hitch is connected. The ball socket member includes a hollow socket 34 having an interior configuration of somewhat greater than one-half of a sphere and carrying a locking member of any suitable or desirable nature which may be the arcuately-faced wedge member 35. The socket 34 carries a rearwardly extending hitch member or draw bar 36 adapted to be joined to the vehicle being drawn by the vehicle from which the draw bar 15 extends. The socket 34 has an opening 37 in its upper surface through which the contact finger 38 of a spring-like negative or ground contact element 39 extends, the element 39 being uninsulated and suitably secured in any desired fashion as by the bolt 40 extending into the hitch member 36. The socket 34 also has opposed openings 41 positioned for registry with the contact plates 28' and receiving the positive contacts 42 of insulated positive contact arms 43, also suitably secured to the assembly as by the bolts 44 extending into the hitch member 36. Electrical conductors 45 extend rearwardly, of course, from the exposed electrical contact tabs 46 at the rearward ends of the insulated contact arms 43.

In the operation of the assembly, the draw bar 15 and ball member 10 will, of course, be affixed to the rearward end of a suitable drawing vehicle with the electrical wires 23 connected, for example to a tail light control switch and to a stop light control switch. The draw bar 15 will establish a neutral or ground connection between the vehicle and the ball member 10. The ball socket assembly is connected by its hitch member 36 to a vehicle to be drawn, the wires 45 being connected as may be desired, again for instance, to the tail lights and stop lights of the trailer or the vehicle being drawn, and the ball socket member is engaged upon and locked to the ball member.

When this is done, the ground finger 38 automatically moves into engagement with the head 17 of the securing bolt, and the contacts 42, because of the spherical configuration or upwardly convexed configuration of the head 17 of the bolt, are spread outwardly as the socket member moves downwardly over the ball member, to come into engagement one with each of the contact plates 28'. Circuitry is now established from the conductors 23 to the conductors 45, and such circuitry will be maintained regardless of lateral, vertical, or transverse tilting of the socket member on the ball member. In some instances, as in short backing turns and the like, the contact fingers 42 may move from engagement with the exposed faces of the contact plates 28', but it is noted that the positioning of the offsets 30 of the contact plates 28' is such that the contacts 42 cannot contact the plates 28' and the curved edged portions 32 of the recesses at the same time so as to create an electrical short. The curved surfaces 32 enable the contact members 42 to ride thereover and to return to contact with the plates 28' when the two vehicles return to a more normal position or relationship. The ground contact 34 of course functions as a common ground for both of the cnductors 45 and hence two separate and distinct circuits to the trailer or drawn vehicle are provided and may be utilized for any desired purposes. The contact plate assemblies 28 may be flexible and resilient in nature, and if so they may readily be flexed and snapped into the groove 27 so as to be anchored into position by a presence of the head 17 of the securing bolt. Also, the plate assemblies may be relatively rigid and may thus be slipped into the groove 27. Thus, it is clear, more or less conventional ball and socket trailer hitches may readily be modified to the present structure with a minimum of machining and other manufacturing operations, that the entire assembly is easily and readily assembled by unskilled labor and that a durable and relatively weather-proof structure is provided.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A trailer hitch including, a ball member for attachment to one vehicle, a ball socket member for attachment to another vehicle and engagement in surrounding relationship with the ball member, a pair of circumferentially spaced recesses in the surface of the ball member having undercut lateral and lower margins to form a peripheral groove on the side and lower edges of the recesses, electrical contact plates received in the recesses and having their margins received in the grooves, means insulating the plates electrically from the ball member, electric conductor means leading to the contact plates, electrical contact means carried by the ball socket member for contacting the contact plates in sliding engagement, and electrical ground contact means carried by the ball socket member for resiliently engaging the ball member.

2. A trailer hitch including, a ball member for attachment to one vehicle, a ball socket member for attachment to another vehicle and engagement in surrounding relationship with the ball member, a pair of circumferentially spaced recesses in the surface of the ball member having undercut lateral and lower margins to form a peripheral groove on the side and lower edges of the recesses, electrical contact plates received recesses and having their margins received in the grooves, means insulating the plates electrically from the ball member, electric conductor means leading to the contact plates, and electrical contact means carried by the ball socket member for contacting the contact plates in sliding engagement, the means insulating the contact plates from the ball member being dielectric sheets positioned between the contact plates and the bottoms of the recesses, the margins of the contact plates being offset toward the bottom of the recesses and embedded in the marginal portions of the dielectric sheets.

3. A trailer hitch including, a ball member for attachment to one vehicle, a ball socket member for attachment to another vehicle and engagement in surrounding relationship with the ball member, a pair of circumferentially spaced recesses in the surface of the ball member having undercut lateral and lower margins to form a peripheral groove on the side and lower edges of the recesses, electrical contact plates received in the recesses and having their margins received in the grooves, means insulating the plates electrically from the ball member, electric conductor means leading to the contact plates, and electrical contact means carried by the ball socket member for contacting the contact plates in sliding engagement, the means insulating the contact plates from the ball member being dielectric sheets positioned between the contact plates and the bottoms of the recesses, the margins of the contact plates being offset toward the bottom of the recesses and embedded in the marginal portions of the dielectric sheets, the margins of the contact plates being offset at points spaced inwardly from the margins of the recesses.

4. A trailer hitch including, a ball member for attachment to one vehicle, a ball socket member for attachment to another vehicle and engagement in surrounding relationship with the ball member, a pair of circumferentially spaced recesses in the surface of the ball member having undercut lateral and lower margin to form a peripheral groove on the side and lower edges of the recesses, electrical contact plates received in the recesses and having their margins received in the grooves, means insulating the plates electrically from the ball member, electric conductor means leading to the contact plates, electrical contact means carried by the ball socket member for contacting the contact plates in sliding engagement, the upper end of the ball member being flat and the ball member having a vertical axial bore, and a fastening bolt having a shank received in the bore and an upwardly convex head abutting the flat upper end of the ball member and overlying the upper margins of the recesses, the ball member having a vertical groove in the wall of its axial bore and transverse grooves in its flat upper end and extending to the recesses for receiving the electric conductor means.

References Cited in the file of this patent

UNITED STATES PATENTS

| 2,143,322 | Knobel | Jan. 10, 1939 |
| 2,564,520 | Blasdell | Aug. 14, 1951 |
| 2,673,965 | Cass | Mar. 30, 1954 |

FOREIGN PATENTS

| 302,012 | Great Britain | Dec. 13, 1928 |
| 1,039,729 | France | May 20, 1953 |